(12) United States Patent
Tucker

(10) Patent No.: US 11,950,021 B2
(45) Date of Patent: Apr. 2, 2024

(54) PRESENTATION OF VIDEO FEED ON ONE DISPLAY TO APPEAR AS THOUGH PRESENTED ON ANOTHER DISPLAY

(71) Applicant: Lenovo (Singapore) Pte. Ltd., Singapore (SG)

(72) Inventor: Matthew Tucker, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 194 days.

(21) Appl. No.: 17/560,236

(22) Filed: Dec. 22, 2021

(65) Prior Publication Data
US 2023/0199148 A1  Jun. 22, 2023

(51) Int. Cl.
| | |
|---|---|
| *H04N 7/15* | (2006.01) |
| *H04N 5/265* | (2006.01) |
| *H04N 5/272* | (2006.01) |
| *H04N 5/45* | (2011.01) |

(52) U.S. Cl.
CPC ............ *H04N 7/157* (2013.01); *H04N 5/265* (2013.01); *H04N 5/272* (2013.01); *H04N 5/45* (2013.01); *H04N 7/152* (2013.01); *H04N 7/155* (2013.01)

(58) Field of Classification Search
CPC ........ H04N 7/152; H04N 7/155; H04N 7/157; H04N 5/265; H04N 5/272; H04N 5/45
USPC ........................................................ 709/204
See application file for complete search history.

(56) References Cited

U.S. PATENT DOCUMENTS

| | | | |
|---|---|---|---|
| 2011/0279638 A1* | 11/2011 | Periyannan | H04N 7/141 348/14.09 |
| 2017/0162177 A1 | 6/2017 | Lebeck et al. | |
| 2017/0323485 A1 | 11/2017 | Samec et al. | |
| 2017/0343811 A1* | 11/2017 | Mese | G02B 27/0172 |
| 2023/0063441 A1* | 3/2023 | Kramer | H04N 5/272 |
| 2023/0136321 A1* | 5/2023 | Eirinberg | H04L 51/222 348/211.09 |
| 2023/0171372 A1* | 6/2023 | Arezki | H03F 3/45475 345/629 |
| 2023/0230085 A1* | 7/2023 | Turgeman | G06Q 20/40145 705/44 |
| 2023/0254412 A1* | 8/2023 | Jorasch | H04L 65/1089 709/204 |

OTHER PUBLICATIONS

Mese et al., "Systems and Methods for Presentation of Images From Camera Concurrently With Presentation of Virtual Reality Content", file history of related U.S. Appl. No. 15/164,045, filed May 25, 2016.

* cited by examiner

*Primary Examiner* — Wing F Chan
*Assistant Examiner* — Leon Y Tseng
(74) *Attorney, Agent, or Firm* — John M. Rogitz; John L. Rogitz

(57) ABSTRACT

In one aspect, a first device may include at least one processor and storage accessible to the at least one processor. The storage may include instructions executable by the at least one processor to receive, from a second device different from the first device, a camera feed of a meeting. The instructions may also be executable to determine that the camera feed shows a first display presenting a particular piece of electronic content. Based on the determination, the instructions may then be executable to overlay, on the camera feed as presented on a second display, a separate video feed of the particular piece of electronic content.

20 Claims, 10 Drawing Sheets

PRESENTATION OF VIDEO FEED ON ONE DISPLAY TO APPEAR AS THOUGH PRESENTED ON ANOTHER DISPLAY

FIELD

The disclosure below relates to technically inventive, non-routine solutions that are necessarily rooted in computer technology and that produce concrete technical improvements. In particular, the disclosure below relates to techniques for presentation of a video feed on one display to appear as though presented on another display.

BACKGROUND

As recognized herein, when viewing a camera feed presented on one display via another display, the camera feed can appear distorted, subject to glare, subject to degraded image resolution, subject to bad lighting and color irregularity, and subject to other negative appearances that can make the feed impossible or near impossible to read. The disclosure below further recognizes that this problem is particularly acute in video conferencing where one or more participants might be remotely-located from a meeting room in which other participants and the content-presenting display itself are located.

Additionally, as also recognized herein, separately presenting individual headshot and content streams to a remote participant during video conferencing can also be undesirable since this leads to a lack of virtual immersion in the meeting.

There are currently no adequate solutions to the foregoing computer-related, technological problems.

SUMMARY

Accordingly, in one aspect a first device includes at least one processor and storage accessible to the at least one processor. The storage includes instructions executable by the at least one processor to receive, from a second device different from the first device, a camera feed of a meeting. The instructions are also executable to determine that the camera feed shows a first display presenting a particular piece of electronic content. Based on the determination, the instructions are executable to overlay, on the camera feed as presented on a second display, a separate video feed of the particular piece of electronic content. The second display is different from the first display.

Thus, in some example implementations the separate video feed may be overlaid for the separate video feed to appear, via the second display, as though the first display is presenting the separate video feed. For example, augmented reality (AR) software may be used to overlay the separate video feed for the separate video feed to appear as though the first display is presenting the separate video feed. The AR software may thus be used to render the separate video feed on the second display such that a real-world object that is located at a location of the meeting and that obstructs at least part of the camera feed's view of the first display is presented on the second display as also obstructing a view, via the second display, of at least part of the separate video feed. The AR software may also be used to render the separate video feed on the second display such that the separate video feed appears, via the second display, in a first angular orientation corresponding to a second angular orientation of the first display as shown in the camera feed.

Also in some example implementations, the separate video feed may be overlaid on the camera feed as presented on the second display using picture-in-picture formatting.

Still further, if desired the instructions may be executable to receive the separate video stream from a third device for overlay on the camera feed as presented on the second display. The third device may be different from the second device or may be the same.

Also if desired, the instructions may be executable to determine that the camera feed shows the first display presenting the particular piece of electronic content by comparing one or more first image frames of the particular piece of electronic content as appearing, via the camera feed, on the first display to one or more second image frames from a file used to generate the separate video stream to match the one or more first image frames to the one or more second image frames. The file may be stored locally at the first device and/or streamed to the first device while the camera feed is streamed to the first device.

In various examples, the first device may be remotely located from the meeting.

Also in various examples, the first device may include the second display.

Also in various examples, the first device may include a server that performs the determination.

In another aspect, a method includes receiving, at a first device and from a second device different from the first device, a camera feed. The method also includes determining that the camera feed shows a first display presenting electronic content. Based on the determining, the method includes superimposing, on part of the camera feed as presented on a second display, a video feed of the electronic content. The second display is different from the first display.

Thus, in certain examples the video feed may be superimposed for the video feed to appear, via the second display, as though the first display is presenting the video feed. For example, the method may include using augmented reality (AR) software to superimpose the video feed for the video feed to appear as though the first display is presenting the video feed.

Also in some examples, the video feed may be superimposed to appear as though being presented from a location of the first display but at a different angular orientation than the first display itself.

In still another aspect, at least one computer readable storage medium (CRSM) that is not a transitory signal includes instructions executable by at least one processor to receive, at a first device and from a second device different from the first device, a camera feed. The instructions are also executable to determine that the camera feed shows a first display presenting electronic content. Based on the determination, the instructions are executable to include, as a presentation of the camera feed on a second display, a video feed of the electronic content from a source other than the camera feed itself. The second display is different from the first display.

In some example implementations, the instructions may be executable to determine that the camera feed shows the first display presenting the electronic content by comparing one or more first image frames of the electronic content as appearing, via the camera feed, on the first display to one or more second image frames from a file comprising the electronic content to match the one or more first image frames to the one or more second image frames.

Additionally, if desired the video feed may be included for the video feed to appear, via the second display, as though the first display is presenting the video feed.

The details of present principles, both as to their structure and operation, can best be understood in reference to the accompanying drawings, in which like reference numerals refer to like parts, and in which:

BRIEF DESCRIPTION OF THE DRAWINGS

FIG. 3 is an illustration of a first example of video overlay consistent with present principles, while

FIG. 5 is an illustration of a second example of video overlay consistent with present principles, while

DETAILED DESCRIPTION

Figure 1:
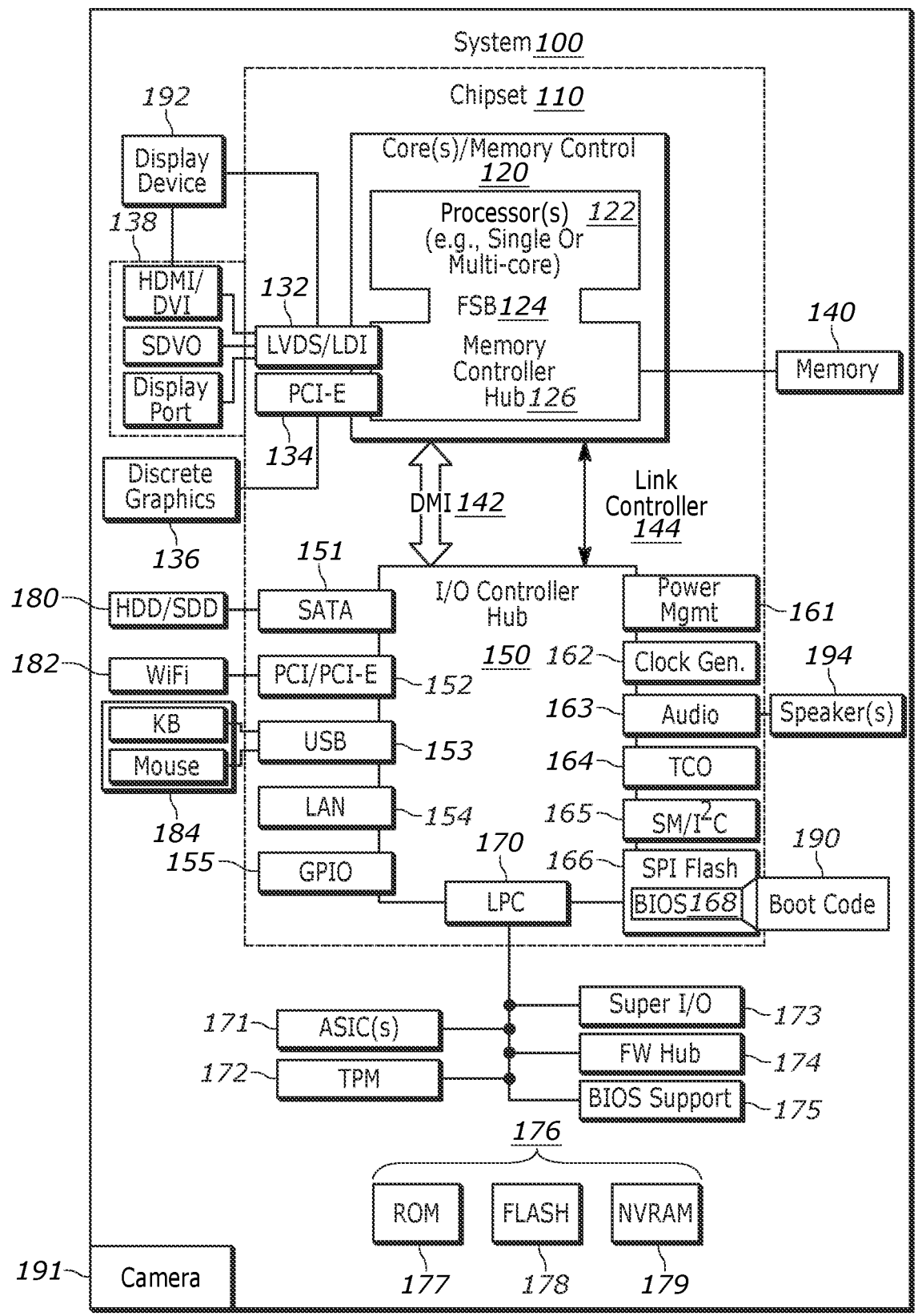
FIG. 1 is a block diagram of an example system consistent with present principles.

Multiple cameras and displays can be used for video conferencing in an immersive way that does not result in image distortion or image degradation. For example, consider that one user might be at home, calling in via video to a meeting that is occurring in an office conference room. This remote user can see video of the conference room and, depending on the placement of the camera in the conference room that provides the video to the remote user, the remote user may use this feed to see additional screen content being shared on another display within the conference room, such as a slide presentation or video of other people calling in to the meeting. To improve clarity, color accuracy, and resolution for the remote user's viewing of this additional screen content, the content/slides may be sent to all participants in a separate video feed which may then be autonomously overlaid on the content/slides as appearing in the camera feed itself (and/or may be manually overlaid via drag and drop actions of separate video feeds presented in a graphical sidebar to create a picture-in-picture format with multiple inset video feeds overlaid on the camera feed).

Thus, software of the conference system may be used to detect when a video feed being shown to a user contains a camera capture of a display that is showing content that is also being provided directly to the conference system, and instead of showing this camera capture of a display showing the video feed, a separate video feed may be dropped directly into what the user is seeing, replacing the camera capture of the video feed on the other display. This may therefore help bypass the image degradation that might otherwise occur when a camera captures video on another display and that camera feed is viewed.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include a camera 191 that gathers one or more images and provides the images and related input to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone as part of video conferencing consistent with present principles.

Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
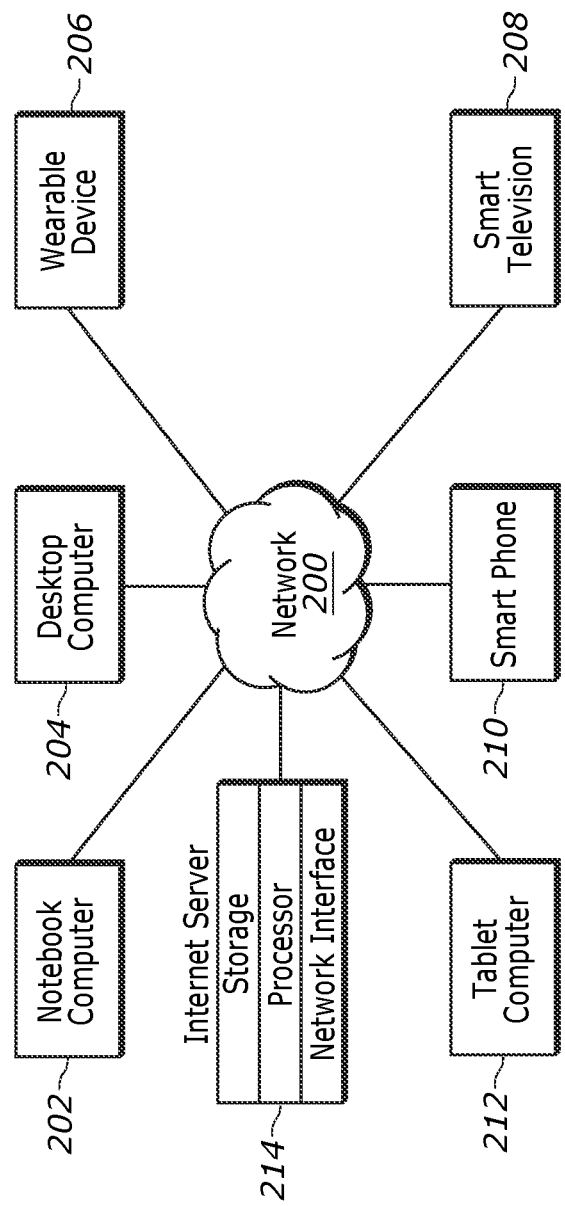
FIG. 2 is a block diagram of an example network of devices consistent with present principles.

Turning now to FIG. 2, example devices are shown communicating over a network 200 such as the Internet in accordance with present principles (e.g., to exchange audio/visual (A/V) video feeds as part of video conferencing). It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
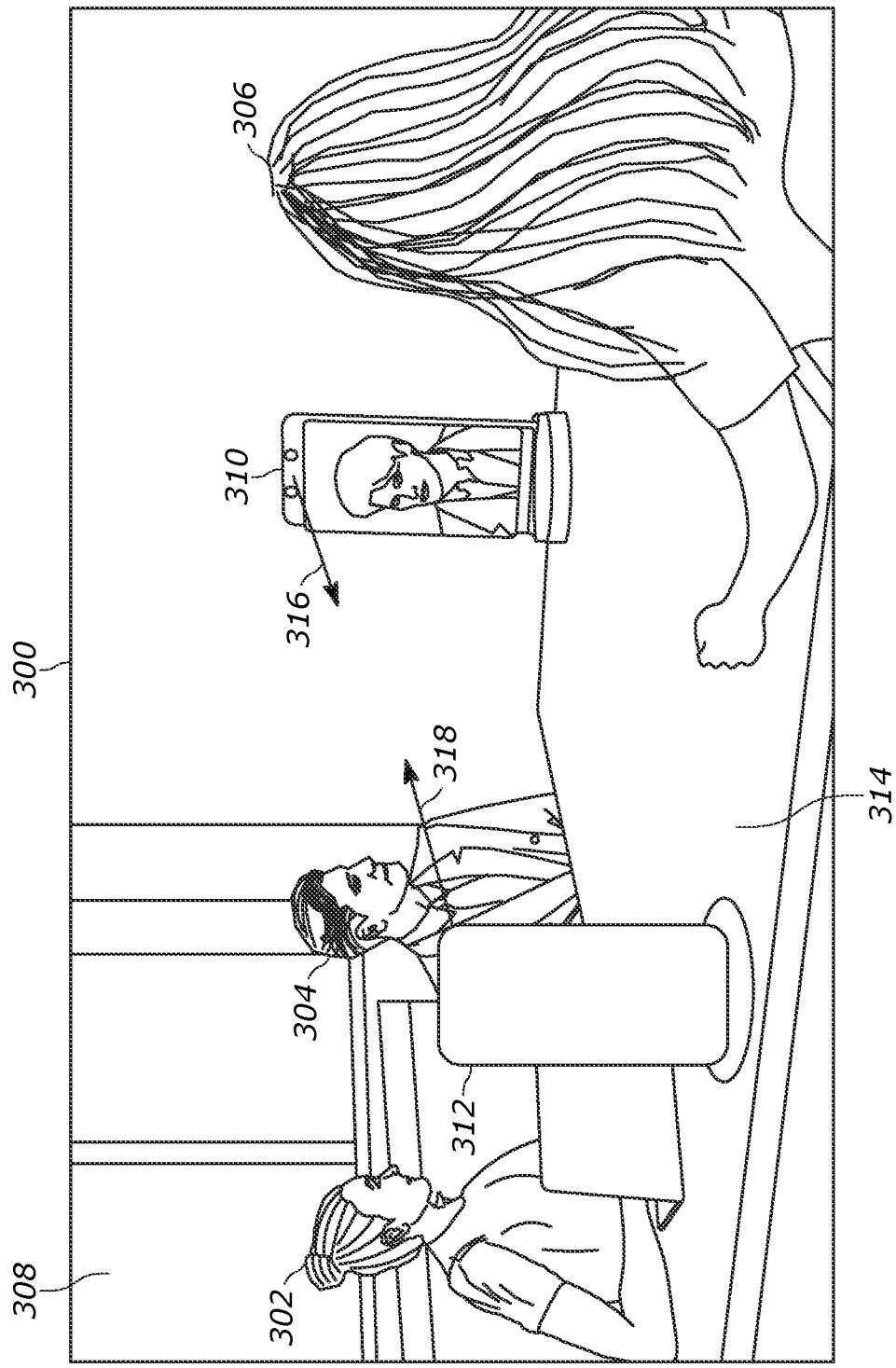

Turning now to FIG. 3, it shows an example illustration 300 consistent with present principles. Suppose multiple meeting participants 302-306 are co-located live and in person at the same location, which in this case is a meeting room 308 of a building. Also suppose that two remotely-located people wish to participate in the meeting via video conferencing software and respective local devices at their remote locations, and that two respective devices 310, 312 (enlarged tablets in the present example) face each other as placed on top of opposing end segments of a table 314 at which the live participants 302-306 are also sitting during the arranged meeting time.

Thus, as also shown in FIG. 3, the display of each device 310, 312 may show a respective real time camera video stream of one of the remotely-located participants' faces based that participant's device at the remote location streaming camera input from its own local camera that shows the user's face. Further note that each device 310, 312 may also stream back, to the same participant for which the real time camera feed is presented on the respective device's display, real time video of the room 308 itself from the perspective of a respective camera at the top of the front face of the respective device 310, 312 itself. Audio of the participants speaking as collected via respective microphones on the respective devices at each location may also be streamed between the devices and presented using local speakers for the local and remote participants to hear and converse with each other.

Together, this provides an immersive experience to both the live participants 302-306 and remotely-located participants. Thus, the live participants 302-306 can look at and speak to each device 310, 312 as if they were looking at and speaking to the associated person themselves. Additionally, the remotely-located participants may have a similar field of view via the camera on the respective device 310, 312 as if they were actually present within the room 308 at the respective location of the associated device 310, 312 itself to similarly look at and converse with the live participants 302-306.

Thus, as also shown in FIG. 3, respective field of view indicators 316, 318 indicate the direction of the respective field of view of the camera on each device 310, 312 and hence the respective field of view that each associated remotely-located participant sees using their own device employed at that participant's respective remote location. However, in terms of the devices 310 and 312, since the display output of one device's display as captured by the other device's camera may become distorted, discolored, or subject to bad lighting (e.g. too bright or too dim) as ultimately rendered to the other respective remotely-located participant using their own local display (which may occur due to any number of issues related to digital image capture, viewing angle, and ambient conditions), a separate video feed of the other respective participant may be superimposed onto the camera feed showing that participant to further enhance the immersive experience. Thus, the superimposed video feed may provide a higher-fidelity appearance of the display content shown on one of the respective devices 310, 312 while still facilitating the immersive experience itself, thereby enhancing the immersive digital experience.

Figure 4:
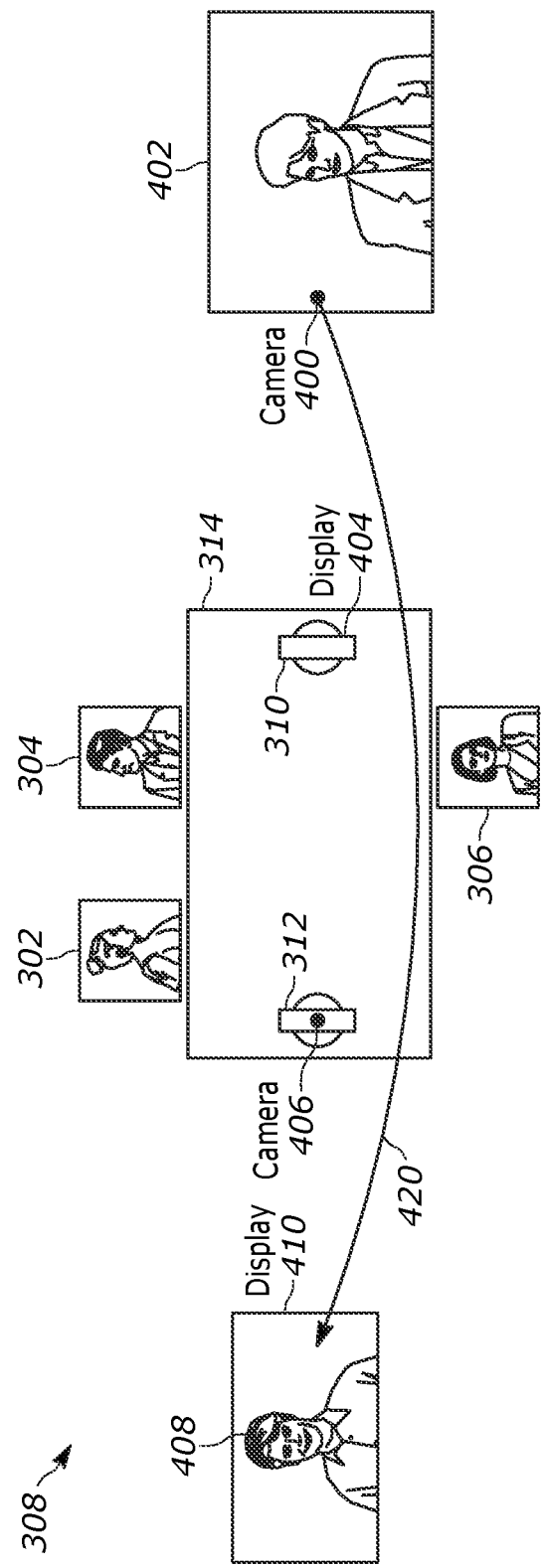
FIG. 4 is a schematic according to this first example.

The schematic diagram of FIG. 4 further illustrates using this same example. As shown in FIG. 4, a camera video feed from a camera 400 on the device that remote participant 402 is using from their own remote location may be streamed to the device 310 for presentation on the display 404 of the device 310 itself so that the participants 302-306 may view the video stream of the user 402 while at the location 308. But as indicated by arrow 420, this video stream may also be separately transmitted from the device of the user 402 to the device of another user 408 that is remotely-located from both the user 402 and location 308. This separate stream may be transmitted directly between the devices of the two remote users, may be routed along the way through an Internet-based server facilitating the video conference, or may be routed through still another device as appropriate.

But regardless, note that the video of the user 402 that the user 408 would ultimately see via a display 410 on the device of the user 408 is not part of the stream from a camera 406 on the device 312 that itself shows the stream of the user 402 from the camera 400 as presented on the display 404. Instead, the feed from the camera 400 that is streamed in real time to the device of the remote participant 408 without any camera capture of this separate stream along the way may be used so that the separate stream is presented on the display 410 via overlay on the (different) video feed from the camera 406 itself. Thus, the separate video stream may replace a portion of the camera feed from the camera 406 (as presented on the display 410) at an image/display location occupied by the display 404 itself to in essence present the same content. Due to this configuration, digital image quality for the video stream of the user 402 that the user 408 ultimately sees may not be degraded due to the camera 406 capturing images of the display 404 as also presenting the video stream of the user 402, helping to avoid the technical issue of digital image degradation and digital image distortion while providing a higher-fidelity stream of the user 402.

Figure 5:
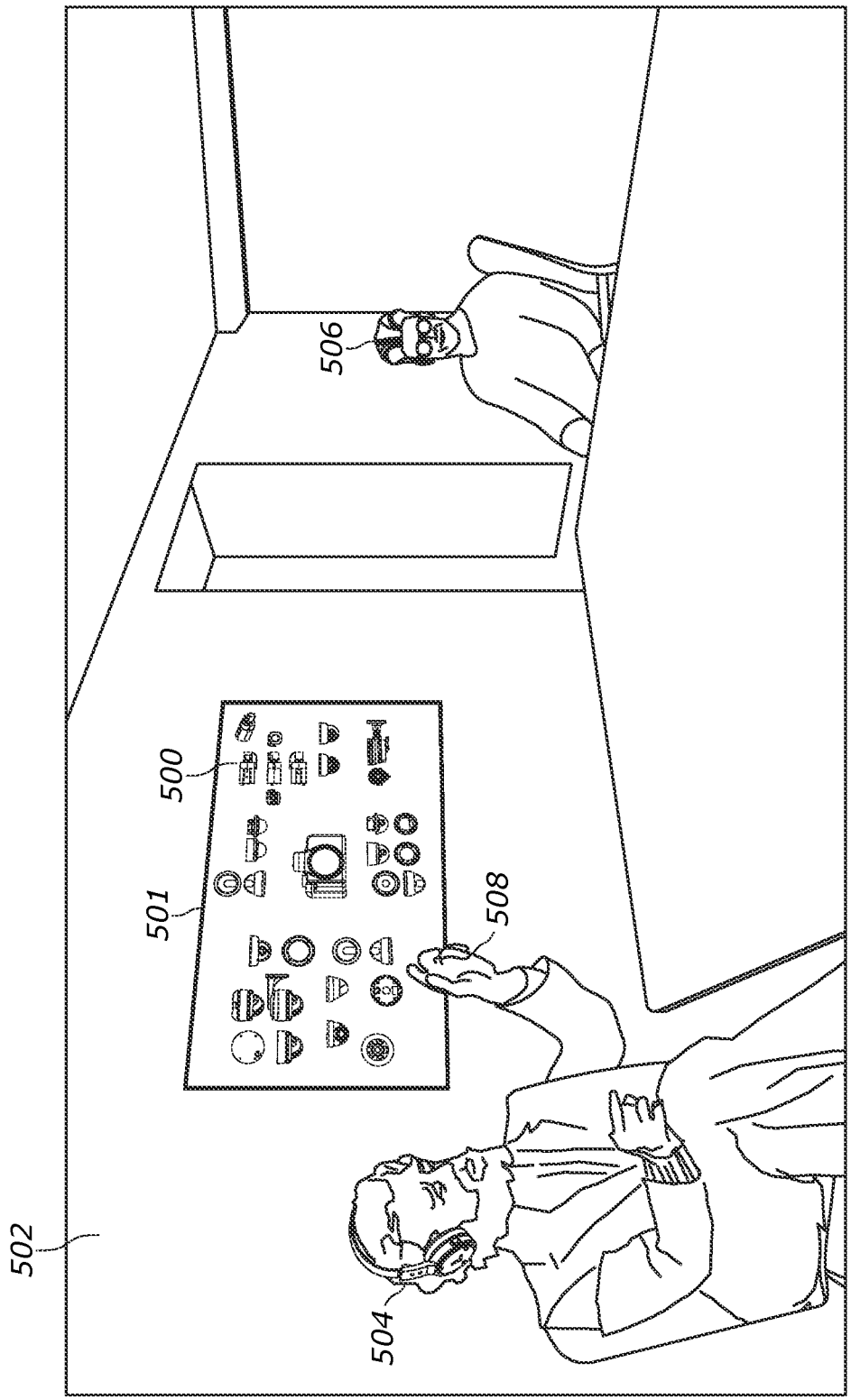

Continuing the detailed description in reference to FIG. 5, another example is shown. In this example, a slide 500 of a slide presentation or other shared digital document that is being presented on a TV display 501 may also establish a separate video feed that is to also be overlaid on a portion of a camera feed showing a field of view of a conference room location 502. Thus, assume the perspective shown in FIG. 5 is the field of view of the camera that is located within the location 502 along with live conference participants 504, 506. Also assume the camera feed according to this field of view is being transmitted to a remotely-located conference participant that is not shown.

Accordingly, owing to the image/video for the slide 500 otherwise being degraded or distorted should it be viewed via the camera feed itself as presented on the remote user's display, conferencing software executing locally and/or remotely relative to the location 502 to present the slide 500 on the display 501 (and transmit an A/V feed of the conference itself) may also be used to separately provide the entire document file, or a specific slide/image from the document that is currently being presented on the display 501, to the remotely-located user's device for overlay on the camera feed of the location 502 itself consistent with present principles.

Augmented reality (AR) software may therefore be used to do so for the separate video feed to appear, via the remote user's display, as though the TV display 501 is presenting the separate video feed itself. Thus, while the TV display 501 might present the same image or same file as streamed to the remote device, as shown in FIG. 5 AR software may be used to replace this content as shown in the camera feed from the location 502 with a higher-fidelity version of the same content but as provided via the separately-transmitted video feed for presentation on the remote display as a hybrid presentation.

Note further that as also shown in FIG. 5, the AR software may be used to render the separate video feed on the remote user's display such that a real-world object (a hand 508 of the user 504 in this case) that that obstructs at least part of the camera feed's view of the TV display 501 is presented on the remote user's display as also obstructing a view, via the remote user's display, of at least part of the separate video feed. Thus, the AR software may mimic the experience the user would otherwise have by simply viewing the camera feed itself and seeing the hand 508 obstruct the same part of the electronic content as actually presented on the TV display 501.

What's more, to further enhance this experience, the AR software may be used to render the separate video feed on the remote user's display such that the separate video feed appears, via the remote user's display, in a first angular orientation corresponding to/matching a second angular orientation of the TV display 501 itself as shown in the camera feed (according to the camera's current field of view/real-world positioning within the location 502 relative to the display 501). Camera lens curvature resulting in certain visual effects on the content may also be mimicked using the AR software. Thus, the separate video feed need not necessarily be presented on the remote display to appear coplanar with the front face of the remote display itself, but may be presented at the same angular orientation as the display 501 to give the 3D impression that the display 501 is actually presenting the separate video feed/underlying electronic content itself.

Figure 6:
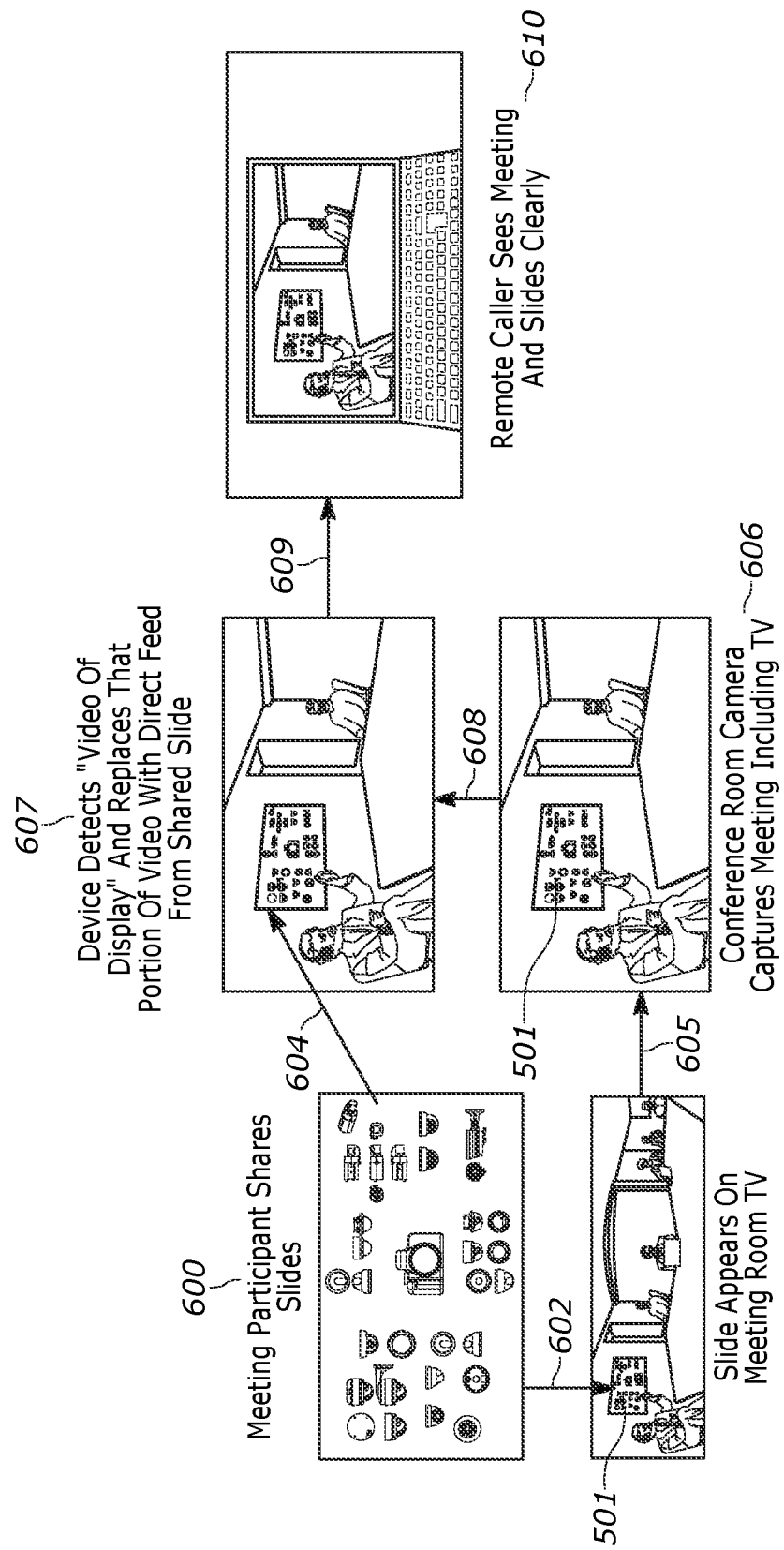
FIG. 6 is a schematic according to this second example.

The schematic of FIG. 6 further illustrates according to this example. At 600, a conference participant shares slides or another digital document via their own personal device. Arrow 602 indicates that the slides are shared with the TV display 501 for presentation thereon. Arrow 604 indicates that the same slides are also separately shared with a remote user's own device as transmitted by the sharing device.

Arrow 605 then indicates that at 606 the camera at the location 502 captures a perspective of the conference room that shows the TV display 501. This may be done so that the remote device, a coordinating server, or the conferencing system software as executing elsewhere may receive the camera feed (as demonstrated by arrow 608) to, at 607, detect that the camera feed from the location 502 is a video that shows another display within the video (display 501) to possibly replace that portion of the camera feed with the direct video feed provided separately as already illustrated by arrow 604.

The detecting device may thus attempt to match what is shown on the display 501 via the camera feed to a portion of the separately-shared document to determine whether the part of the camera feed showing the content as presented on the TV display 501 may be replaced with the direct, separate feed of the same content. Thus, arrow 609 indicates that at 610 the remotely-located participant may see the meeting clearly while also seeing the slides themselves clearly due to the AR overlay of the slides onto the camera feed.

Accordingly, based on the two examples above it is to be understood that a conferencing system/device operating consistent with present principles may replace camera-generated video of electronic content as presented on another display regardless of whether the electronic content is an electronic document or other electronic file, a video stream of another person, or a video stream of something else that is also being provided directly to the conferencing system/devices.

Figure 7:
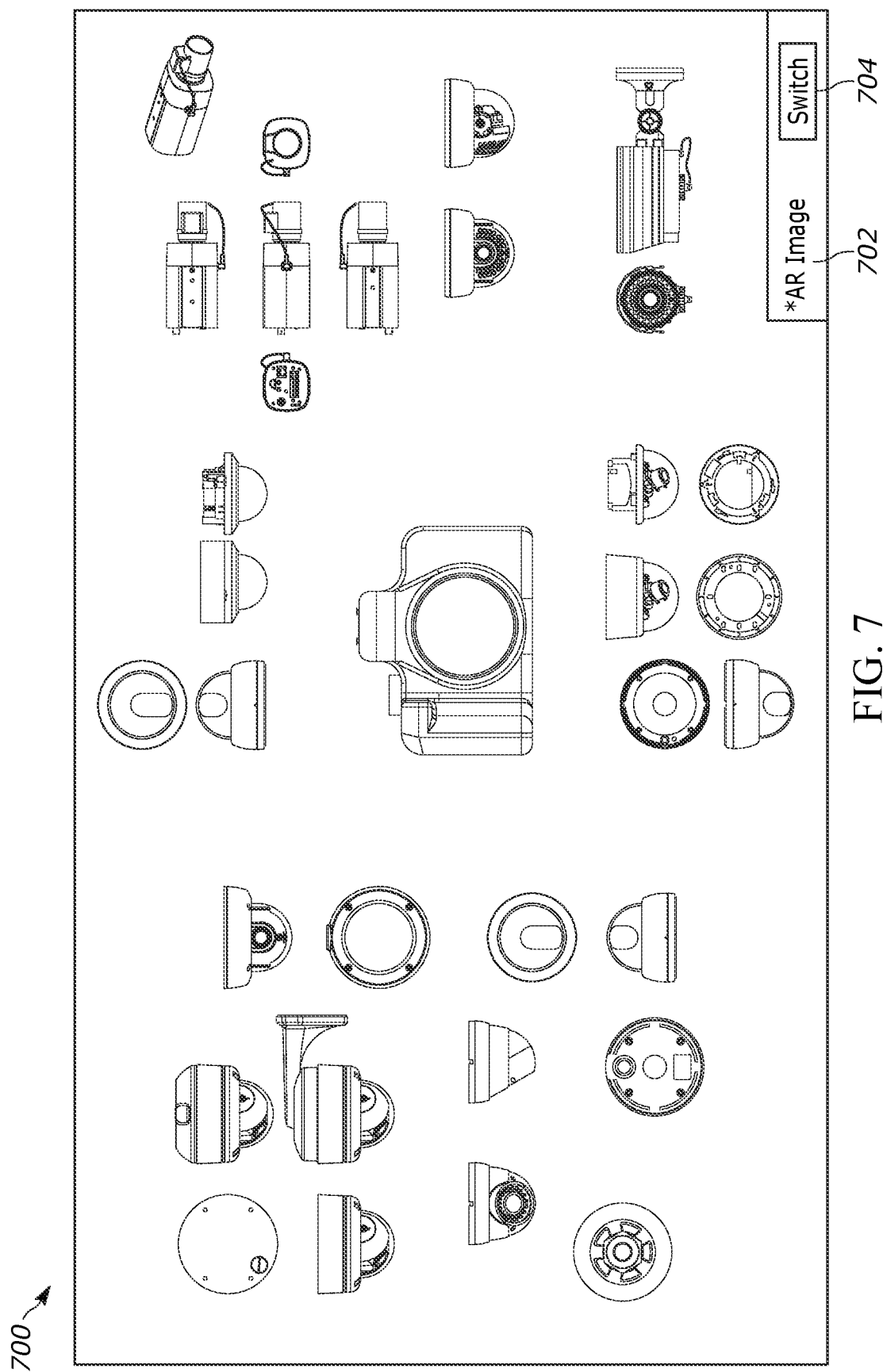
FIG. 7 shows an example graphical user interface (GUI) that may be overlaid on a camera feed consistent with present principles.

Turning now to FIG. 7, a graphical user interface (GUI) 700 is shown. It is to be understood that the GUI 700 may establish or be included as part of the separate/replacement video feed of the electronic content as described above in reference to FIGS. 5 and 6. Thus, the slide 500 from above forms part of the example GUI 700, with it being further understood that the GUI 700 itself may be overlaid on a camera feed consistent with present principles. The GUI 700 may include not just the slide 500 but also an indication 702 (established by both a star icon and text as shown) that indicates that the GUI 700/side 500 is an AR-generated image being overlaid onto the camera feed.

To further enhance device functionality and ease of use, the GUI 700 may also include a selector 704 that a user may select using touch input, cursor input, etc. to command the device/system to stop presenting the AR-generated overlay and instead simply present the camera feed itself without overlay. Thus, selection of the selector 704 may cause the user's own display (e.g., remotely-located from a meeting) to remove the GUI 700 from presentation and simply present the camera feed itself. Note that similar indications and selectors may be presented for any electronic contents from a separate video feed that are ultimately overlaid on a camera feed as described herein, and that such GUIs may be presented using AR software as described above (e.g., presented at an angular orientation matching that of the TV 501).

Figure 8:
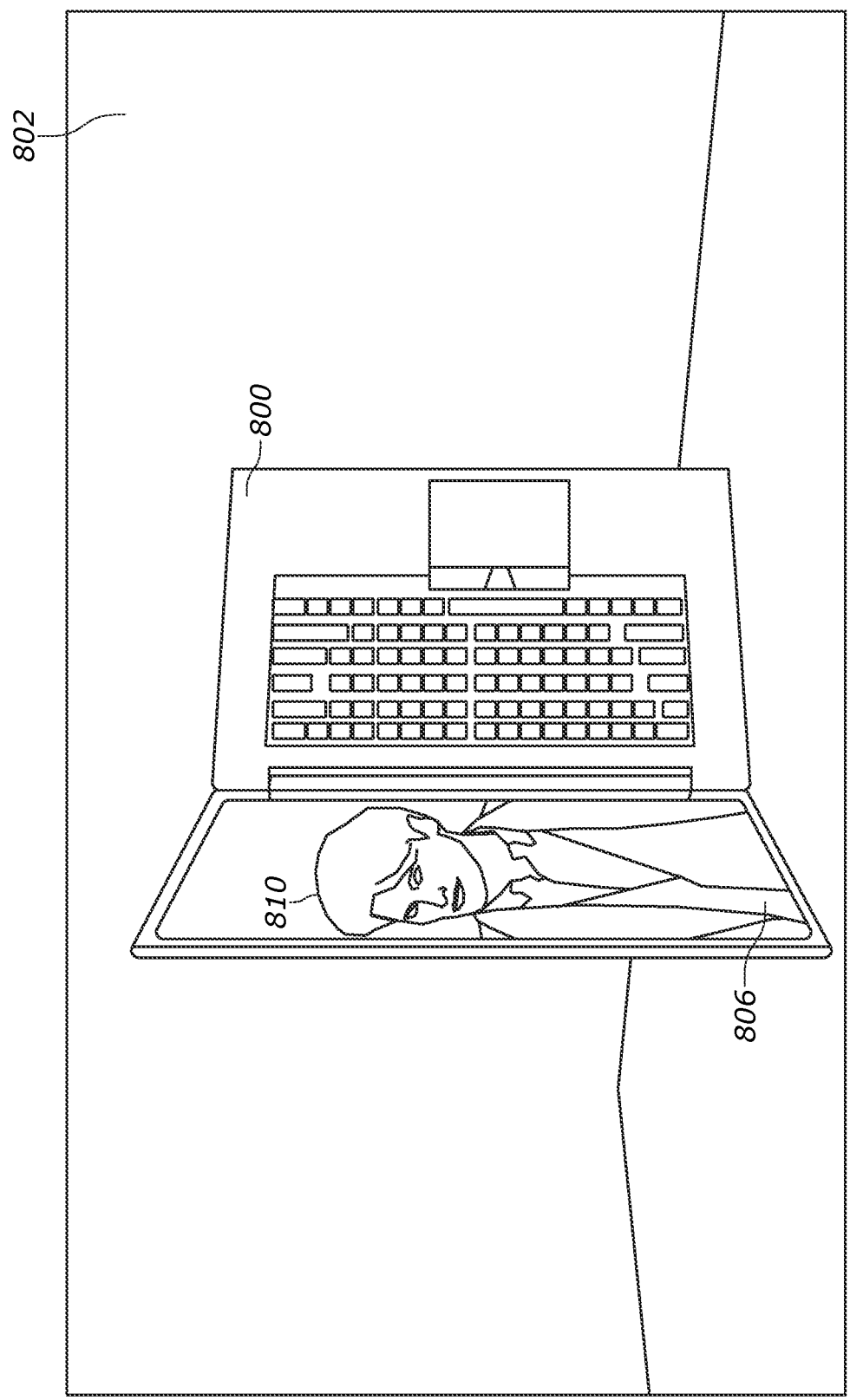
FIG. 8 shows a perspective view of a third example of video overlay consistent with present principles.

Continuing the detailed description in reference to FIG. 8, another example is shown. Here, a camera feed 802 as presented on a display is shown, with the feed 802 itself showing a laptop 800. The laptop 800 includes a display 806 that is itself presenting a camera feed of a remotely-located meeting participant 810 as provided by that participant's own camera.

Distinguishing this example from the one described in reference to FIGS. 5 and 6, the angle at which the display 806 is shown via the camera feed 802 results in an angular orientation of the front face of the display 806 of more than a threshold amount/angle relative to the X-Y plane of the field of view of the camera that generated the feed 802. So here, responsive to detecting this threshold as being met, when the feed 802 is presented on the display of another device (not shown but remotely-located from the location of the laptop 800 itself), AR software may be used to present a separate video feed of the person 810 over top of the portion of the feed 802 that shows the person 810 as presented on the display 806 itself, but at a different angular orientation than the display 806 itself. But further note the AR software may still be used to present the separate video feed to appear as though presented at a location/depth of the display 806 itself. However, in other example embodiments AR software need not be used and instead picture-in-picture formatting may be used to present the separate video feed even if it does not appear as though presented at the location/depth of the display 806 itself.

Either way, according to this example the separate video feed may be overlaid for the separate video feed presentation to oriented in a plane parallel to the front face of the remotely-located display itself (that is also being used to present the feed 802) so that the separate video feed is facing the user even if this does not give the 3D impression that the display 806 is actually presenting the separate video stream due the angular orientation of the display 806. Thus, image distortion due to any number of things such as glare/reflections from the display 806 itself and/or extreme angular orientation of the display 806 with respect to the field of view of the camera that generates the feed 802 may be remedied so the user can adequately see the person 810.

Figure 9:
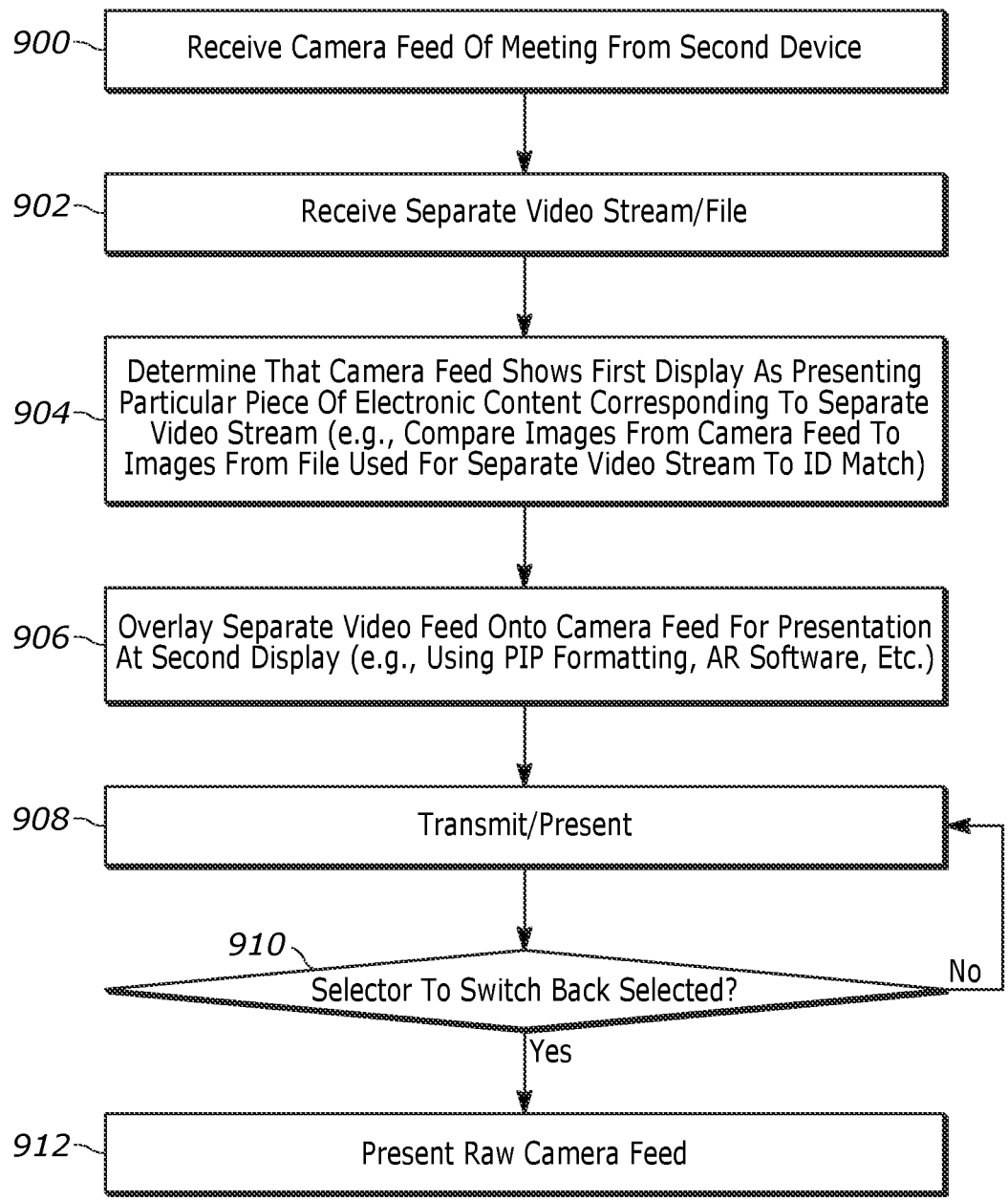
FIG. 9 shows example logic in example flow chart format that may be executed by a device consistent with present principles.

Now referring to FIG. 9, it shows example logic that may be executed by a first device such as the system 100, a local device within a meeting room of a meeting, a remotely-located device being used for participating in the meeting, and/or a coordinating server, etc. in any appropriate combination consistent with present principles. Note that while the logic of FIG. 9 is shown in flow chart format, other suitable logic may also be used.

Beginning at block 900, the first device may receive (e.g., from a second device different from the first device), a camera feed of the meeting. The logic may then move to block 902 where the first device may receive a separate video stream or entire file for a particular piece of electronic content, either from the same device that is providing the camera feed or from another device such as conferencing server or another client device at the location of the meeting that is sharing the electronic content on the first display. For example, a real time video stream of a remote meeting participant may be received at block 902. As another example, at block 902 the first device may receive a real time video stream of a particular slide or other display presentation that is also being concurrently presented on a meeting room display as part of the meeting, or even the entire file itself for the slide presentation or other electronic content.

Thereafter the logic may proceed to block 904 where the first device may determine that the camera feed received at block 900 shows a first display as presenting the particular piece of electronic content also indicated in the separate video stream or file received at block 902. For example, the first device may do so by comparing one or more first image frames of the particular piece of electronic content as appearing on the first display via the camera feed received at block 900 to one or more second image frames from the file used to generate the separate video stream received at block 902 to identify a match of the one or more first image frames to the one or more second image frames (e.g., whether the entire file was received by the first device and stored locally at the first device or only a stream of the particular content that is currently presented on the first display is received).

Then responsive to determining the match, the logic may move to block 906. At block 906 the first device may overlay, on the camera feed as being or to be presented on a second display, the separate video feed of the particular piece of electronic content that was received at block 902. Again, note that AR software may be used to do so as described above for the separate video feed to appear as though the first display is presenting the separate video feed. However, also note that in some example embodiments like the example described in reference to FIG. 8, the separate video feed may be overlaid on the camera feed as presented on the second display using picture-in-picture formatting.

Thereafter, the logic may proceed to block 908. If the presentation of the camera feed with separate video feed overlay is generated by a server or other device, at block 908 the combined presentation may be provided to another device controlling the second display to present the presentation on the second display. If the presentation is generated by the device itself that has the second display (e.g., as remotely-located from the meeting itself), that device may simply present the presentation at block 908.

From block 908 the logic may then proceed to decision diamond 910. At diamond 910 the first device may determine whether a selector such as the selector 704 has been selected to switch back to presenting the camera feed itself without separate video overlay. A negative determination at diamond 910 may cause the logic to revert back to block 908 to continue presenting the presentation having the overlay, while an affirmative determination at diamond 910 may instead cause the logic to proceed to block 912 to control the second display to present the camera feed without the separate video overlay.

Figure 10:
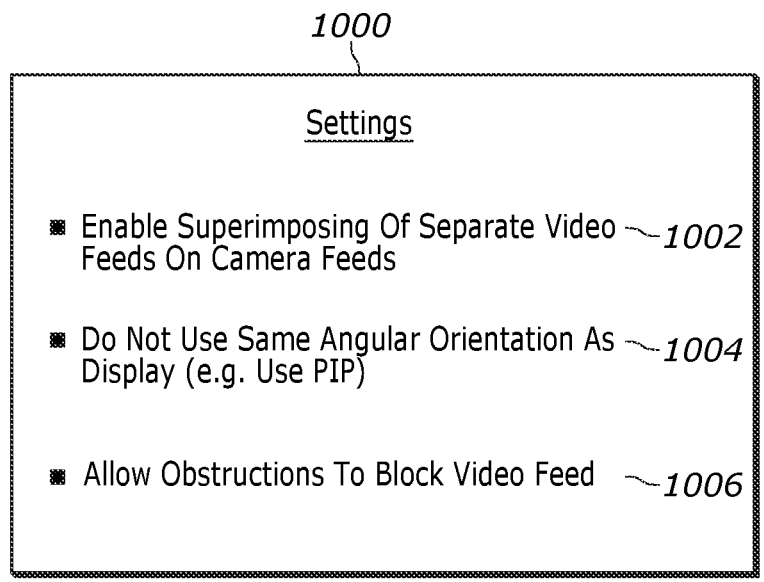
FIG. 10 shows an example GUI that may be presented on a display to configure one or more settings of a device to operate consistent with present principles.

Now referring to FIG. 10, another example GUI 1000 is shown that may be presented on the display of the device undertaking the logic of FIG. 9 or another display of a connected device. The GUI 1000 may be a settings GUI that may be presented to set or enable one or more settings of the device to operate consistent with present principles. For example, the GUI 1000 may be reached by navigating a main settings menu of the device or settings menu of a video conferencing application to configure settings of the device or conferencing system to operate consistent with present principles. Also note that in the example shown, each option discussed below may be selected by directing touch or cursor input to the respective check box adjacent to the respective option.

As shown in FIG. 10, the GUI 1000 may include an option 1002 that may be selectable a single time to set or configure the device to undertake present principles in multiple future instances, such as executing the functions described above in reference to FIGS. 3-8 and executing the logic of FIG. 9 in the future to include a separate video feed on top of a camera feed.

The GUI 1000 may also include an option 1004 that may be selectable to set or configure the device to not use a same angular orientation for content overlay as the angular orientation of the associated display itself shown in a camera feed. Thus, for example, should the option 1004 be selected then the device may use picture-in-picture formatting instead.

Still further, the GUI 1000 may include an option 1006 to set or configure the device to, while using AR software to present a separate video feed overlay, allow real-life obstructions to block part of the separate video feed as described above in reference to FIG. 5.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A first device, comprising:
at least one processor; and
storage accessible to the at least one processor and comprising instructions executable by the at least one processor to:
receive, from a second device different from the first device, a camera feed of a meeting;
determine that the camera feed shows a first display presenting a particular piece of electronic content by comparing one or more first image frames of the particular piece of electronic content as appearing, via the camera feed, on the first display to one or more second image frames from a file used to generate a separate video feed of the particular piece of electronic content to match the one or more first image frames to the one or more second image frames; and
based on the determination, overlay, on the camera feed as presented on a second display, the separate video feed of the particular piece of electronic content, the second display being different from the first display.

2. The first device of claim 1, wherein the separate video feed is overlaid for the separate video feed to appear, via the second display, as though the first display is presenting the separate video feed.

3. The first device of claim 2, wherein augmented reality (AR) software is used to overlay the separate video feed for the separate video feed to appear as though the first display is presenting the separate video feed.

4. The first device of claim 3, wherein the AR software is used to render the separate video feed on the second display such that a real-world object that is located at a location of the meeting and that obstructs at least part of the camera feed's view of the first display is presented on the second display as also obstructing a view, via the second display, of at least part of the separate video feed.

5. The first device of claim 3, wherein the AR software is used to render the separate video feed on the second display such that the separate video feed appears, via the second display, in a first angular orientation corresponding to a second angular orientation of the first display as shown in the camera feed.

6. The first device of claim 1, wherein the separate video feed is overlaid on the camera feed as presented on the second display using picture-in-picture formatting.

7. The first device of claim 1, wherein the instructions are executable to:
receive the separate video feed from a third device for overlay on the camera feed as presented on the second display.

8. The first device of claim 1, wherein the file is one or more of: stored locally at the first device, streamed to the first device while the camera feed is streamed to the first device.

9. The first device of claim 1, wherein the first device is remotely located from the meeting.

10. The first device of claim 1, comprising the second display.

11. The first device of claim 1, wherein the first device comprises a server that performs the determination.

12. A method, comprising:
receiving, at a first device and from a second device different from the first device, a camera feed;
determining that the camera feed shows a first display presenting a particular piece of electronic content at least in part by comparing one or more first image frames of the particular piece of electronic content as appearing, via the camera feed, on the first display to one or more second image frames from a file used to generate a separate video feed of the particular piece of electronic content to match the one or more first image frames to the one or more second image frames; and
based on the determining, superimposing, on part of the camera feed as presented on a second display, a first video feed of the electronic content, the second display being different from the first display.

13. The method of claim 12, comprising:
using augmented reality (AR) software to superimpose the first video feed for the first video feed to appear as though the first display is presenting the first video feed.

14. The method of claim 12, wherein the first video feed is superimposed to appear as though being presented from a location of the first display but at a different angular orientation than the first display itself.

15. The method of claim 12, wherein the first video feed is superimposed for the first video feed to appear, via the second display, as though the first display is presenting the first video feed.

16. At least one computer readable storage medium (CRSM) that is not a transitory signal, the computer readable storage medium comprising instructions executable by at least one processor to:
receive, at a first device and from a second device different from the first device, a camera feed;
determine that the camera feed shows a first display presenting a particular piece of electronic content at least in part by comparing one or more first image frames of the particular piece of electronic content as appearing, via the camera feed, on the first display to one or more second image frames from a file used to generate a separate video feed of the particular piece of electronic content to match the one or more first image frames to the one or more second image frames; and
based on the determination, include, as a presentation of the camera feed on a second display, a first video feed of the electronic content from a source other than the camera feed itself, the second display being different from the first display.

17. The at least one CRSM of claim 16, wherein the instructions are executable to:
use augmented reality (AR) software to superimpose the first video feed for the first video feed to appear as though the first display is presenting the first video feed.

18. The at least one CRSM of claim 16, wherein the first video feed is included to appear as though being presented from a location of the first display but at a different angular orientation than the first display itself.

19. The at least one CRSM of claim 16, wherein augmented reality (AR) software is used to render the first video feed on the second display such that a real-world object that is located at a location of the first display and that obstructs at least part of the camera feed's view of the first display is presented on the second display as also obstructing a view, via the second display, of at least part of the first video feed.

20. The at least one CRSM of claim 16, wherein the first video feed is included for the first video feed to appear, via the second display, as though the first display is presenting the first video feed.

* * * * *